June 17, 1941.  M. A. HOLPFER  2,245,919
POWER TRANSMISSION MECHANISM
Filed Feb. 11, 1941  2 Sheets—Sheet 2
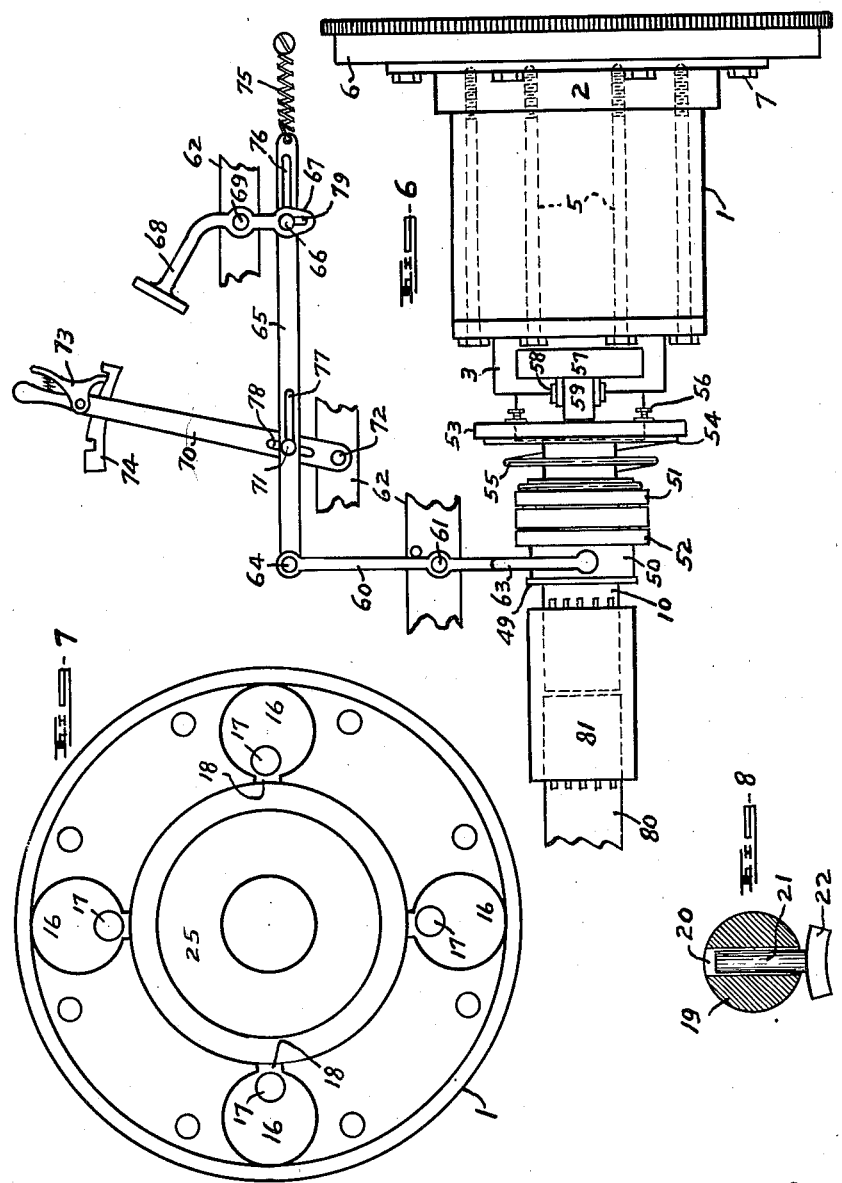
Inventor
Marcus A. Holpfer
By Jack Snyder
Attorney Patented June 17, 1941

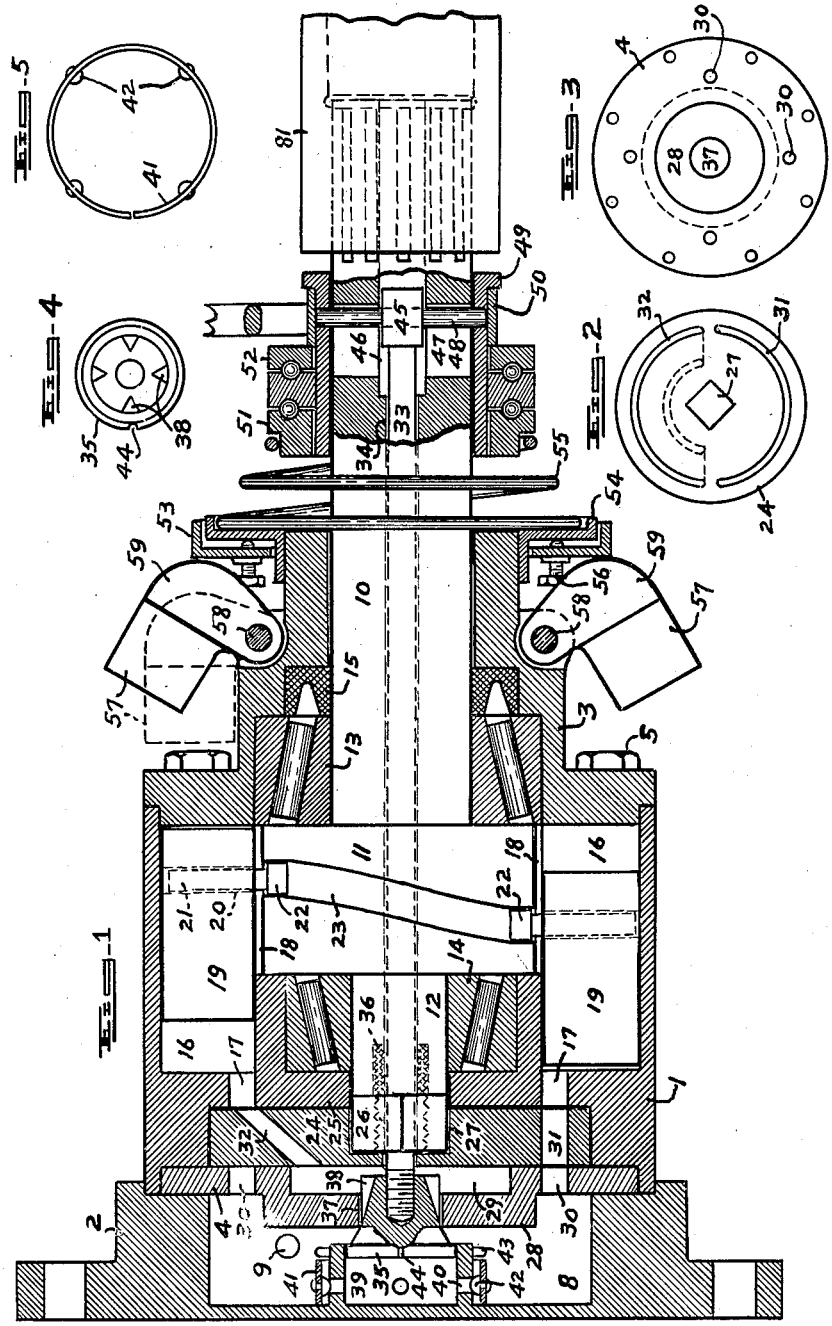

2,245,919

UNITED STATES PATENT OFFICE 2,245,919

POWER TRANSMISSION MECHANISM

Marcus A. Holpfer, Pittsburgh, Pa.

Application February 11, 1941, Serial No. 378,371

2 Claims. (Cl. 192—59)

This invention relates to a power transmission mechanism, and while primarily intended and designed for use in connection with the drive transmission of a motor vehicle, it will be obvious that the device may be employed in any other type of apparatus wherein it is found to be applicable.

Important objects and advantages of the invention are to provide a power transmission mechanism of the character described, which is fluid controlled and automatically operable for quietly and positively transmitting change-speed driving power, which is simple in its construction and arrangement, compact, and comparatively economical in its manufacture, installation, operation, and maintenance.

With the foregoing and other objects in view which will appear as the description proceeds, the invention resides in the novel construction, combination and arrangement of parts herein specifically described and illustrated in the accompanying drawings, but it is to be understood that the latter is merely illustrative of an embodiment of the invention, and that the actual needs of practice and manufacture may require certain mechanical variations from the embodiment shown. It is, therefore, not intended to limit the invention to the disclosure thereof herein illustrated, but rather to define such limitations in the scope of the claims hereunto appended.

In the drawings wherein like numerals of reference designate corresponding parts throughout the several views:

Figure 1 is a longitudinal, cross sectional view of a power transmission mechanism constructed in accordance with the invention.

Figures 2 and 3 are, respectively, rear end views of the valve plate and the fluid control disk.

Figure 4 is a rear end view of the valve head.

Figure 5 is an end view of the valve ring.

Figure 6 is a side elevational view of the mechanism and illustrating control elements for the latter.

Figure 7 is a rear end view of the cylinder casing.

Figure 8 is a transverse, cross sectional view of a plunger, and showing the engagement of the latter with the slide shoe.

Referring in detail to the drawings, the complete housing structure of the power transmission mechanism comprises a cylinder casing 1, a flanged connecting plate 2 disposed at the front end of the casing, and a flanged bearing section 3 positioned at the rear end of the latter. A valve plate 4 is mounted between the front end of the casing and the rear end of the connecting plate. The casing 1, the connecting plate 2, the bearing section 3 and the valve plate 4 are all rigidly secured together by a plurality of bolts 5.

The connecting plate 2 is intended to be secured directly to the fly wheel 6 of a motor vehicle engine, but may be joined with any other suitable source of driving power. The connecting plate is formed to provide a reservoir 8 for containing any suitable operating liquid or fluid employed in connection with the operation of the mechanism. The connecting plate is provided with a plugged aperture 9, through which the fluid may be drained from or replaced in the reservoir 8.

A driven shaft 10 is mounted in the bearing section 3, and includes a fixed, enlarged drum portion 11 and a fixed, reduced shaft extension 12. The drum portion is disposed in the cylinder casing 1, and the shaft extension projects forwardly in the latter from said drum portion. The driven shaft 10 is suitably journalled for rotation in the housing structure by a pair of roller bearings, respectively indicated at 13 and 14, and is provided with a suitable packing member 15 to prevent fluid leakage around the driven shaft from the housing structure.

The side wall of the cylinder casing 1 is provided with a plurality of cylinders 16, which are disposed longitudinally and in parallel relation to each other. The rear ends of the cylinders are closed by the attached bearing section 3, and the front wall of each is provided with a fluid aperture 17. The inner side of the wall of each of the cylinders is formed with an elongated slot 18 opening into the interior of the casing 1.

A cylindrical plunger 19 is mounted for longitudinal, reciprocal movement in each of the cylinders 16. Each of the plungers is provided, adjacent to its rear end, with a transversely extending bearing aperture 20, in which the bearing stem 21 of a cam shoe 22 is pivotally engaged.

The cam shoe 22 is shaped to conform to and is slidable in an annular cam groove 23 formed in the peripheral surface of the drum portion 11 of the shaft 10. The bearing stems 21 project through respective cylinder slots 18, and the latter allow the reciprocal movements of the former therein during the operation of the mechanism.

The conformation of the cam groove 23 and the sliding engagement of the cam shoes 22 in said groove is such that, continuous, longitudinal, reciprocal movement is imparted to the plungers 19 in the cylinders 16, when the entire housing structure is rotating independently of the driven shaft 10 and of the drum portion 11.

While the number of plungers 19 may be varied, the embodiment disclosed provides four plungers, which are disposed at right angles relatively to each other in respective cylinders 16. When the plungers are actuated by the rotation of the housing structure, one pair of adjacent plungers will shift rearwardly in the fluid suction stroke, while the other adjacent pair of plungers will simultaneously shift forwardly in the fluid discharge stroke. During a complete rotation of the housing structure each of the plungers will have made a full suction and discharge stroke in its cylinder.

A circular fluid control disk 24 is revolubly mounted in a recess provided therefor in the front wall 25 of the casing 1, and is maintained in position by the frictional engagement of the valve plate 4 therewith. The shaft extension 12 has a squared free end 26, which extends through an opening in the front wall 25 and engages in a correspondingly-shaped pocket 27 formed in the control disk, whereby like movements of the latter and of the driven shaft 10 are effected.

The valve plate 4 has a forwardly disposed central portion 28, which projects into the fluid reservoir 8 and provides a fluid pressure chamber 29 between said portion 28 and the control disk 24. The valve plate 4 has four fluid suction ports 30 disposed at right angles to each other outwardly of the central portion 28. The ports 30 communicate with the reservoir 8 and are positioned in aligned registration with the apertures 17 in the forward walls of respective cylinders 16.

The control disk 24 is provided with a pair of arcuately-shaped slots, respectively indicated at 31 and 32. The slot 31 is a suction slot and disposed to register with the suction ports 30 in the valve plate 4 and with the apertures 17 in the front walls of the cylinders 16. The slot 32 is a fluid discharge slot and is disposed at an angle from the horizontal, whereby the rear opening thereof registers with the cylinder apertures 17, while the front opening of said slot communicates with the pressure chamber 29. The slots 31 and 32 have their respective ends disposed adjacent to each other and control the passage of the operating fluid to and from the cylinders 16 in the manner to be described.

A valve stem 33 of considerable length is mounted and longitudinally shiftable in a passage 34 provided therefor in the shaft 10. The front end of the stem 33 extends through the squared shaft end 26 and through the control disk 24, and carries a valve head 35 threadedly secured thereto. Packing elements 36 surround the stem 33 at the free end of the shaft extension 12 to prevent leakage through the stem passage 34.

The valve head 35 extends into and seats in a seating aperture 37 formed in the control portion 28 of the valve plate 4. The rear portion of the valve head 35 is formed with a plurality of discharge passages 38, which decrease in transverse capacity area from the rear toward the front ends thereof.

The front end of the valve head 35 is shiftably engaged in a short cylinder 39, which is carried by the connecting plate 2 and projects into the fluid reservoir 8. The wall of the cylinder 39 is provided with a plurality of fluid discharge ports 40, which are disposed adjacent to the attached end of said cylinder. The latter is surrounded by a split, resilient, annular valve ring 41, which carries a plurality of fixed valve members 42 engaging in respective discharge ports 40. The valve ring 41 is maintained on the cylinder 39 by lugs 43 carried by the latter, or in any other suitable manner. The front end of the valve head is provided with a small, peripherally disposed notch 44 to provide a small leak passage between the cylinder 39 and the reservoir 8. The function of the cylinder 39 and its associated parts, as set forth, is to provide a dash-pot action effecting retardation and thereby preventing the sudden or snap return of the valve head 35 to the closing or seating position for the purpose to be described.

The valve stem 33 has an enlarged rear end 45 engaged in an enlarged passage 46 at the rear end of the driven shaft 10, the rear end of which latter projects a considerable distance beyond the rear end of the bearing section 3.

To secure the valve head 35 in the open, neutral or inoperative position, a manually operated control mechanism is provided. The latter comprises a sleeve 49 mounted and longitudinally shiftable on the shaft 10. The latter is formed with a transversely disposed slot 47 which is covered by the sleeve 49. A cross pin 48 extends through the valve stem end 45, through the slot 47, and through the sleeve 49, and is maintained in position by an annular spring band 50 clamped around the sleeve 49.

The sleeve 49 carries a pair of ball bearings, respectively indicated at 51 and 52. A pair of spring plates, respectively indicated at 53 and 54 is mounted and longitudinally shiftable on the rear end of the bearing section 3. A spiral spring 55 is mounted on the shaft 10 and has one end engaged in the spring plate 54, and the other end thereof is seated against and engages the bearing 51. The spring plates 53 and 54 are adjustable, to regulate the tension of the spring 55, by means of bolts 56, which are carried by the plate 53 and engage the plate 54.

A pair of centrifugally actuated weight members 57 is pivotally connected, as at 58, to the bearing section 3, and include cam portions 59 engaging the front face of the spring plate 53. The action of the spring 55 normally forces the spring plates 53 and 54 forwardly on the bearing section 3 to hold the weight members 57 in the contracted, or inoperative positions, as shown in dash lines in Figure 1. The action of the spring 55 further normally forces the sleeve rearwardly on the shaft 10, whereby the valve stem 33 is also drawn rearwardly in the passage 34 to hold the valve head 35 in the closed seated position in the seating aperture 37.

The manually operated control mechanism for securing the device in the neutral position may comprise an actuating lever 60, which has a pivotal connection 61, intermediate of its length, with the motor vehicle structure 62. The lower end of the actuating lever 60 carries a fork 63, which loosely straddles the sleeve 49, and which is adapted to engage the bearing 52 to shift the latter together with the sleeve 49, valve stem 33, and valve head 35, whereby the latter is disposed in the open position in the seating aperture 37. The upper end of the lever 60 has a pivotal connection 64 with the rear end of a shifting bar 65. The latter has a pivotal connection 66 with the depending leg 67 of an operating pedal 68, which has a pivotal connection 69 with the vehicle structure 62.

A hand lever 70 has a pivotal connection 71 with the shifting bar 65, and has a pivotal connection 72 at its lower end with the vehicle structure 62. The hand lever is provided with a spring controlled latch 73 engaging in a notched fixed quadrant 74. The rearward movement of the hand lever 70 or the forward movement of the pedal 68 will actuate the control device to shift the valve head to the open or neutral position. By engaging the latch 73 in the notched quadrant 74 the control device is held in position to maintain transmission mechanism in the neutral or inoperative position. A spring 75 is connected with the forward end of the shifting bar 65 and normally functions to automatically return the control device to its normal inoperative position. The shifting bar 65, the hand lever 70 and the pedal leg 67 are suitably slotted, as respectively indicated at 76, 77, 78 and 79, for the engagement of respective connections 66 and 71, to allow compensation for any variations in the relative positions of the involved parts of the control during the operations of the latter.

The shaft 10 may have its rear end operatively joined with a transmission shaft 80, by means of a sleeve coupling 81, as shown, or in any other suitable manner to best meet conditions found in practice.

In practice the operation of my improved power transmission mechanism is as follows: Assuming the device is employed in connection with the drive of a motor vehicle, the operator sets the hand lever 70 in the released position, as shown in Figure 6. The normal action of the spring 55 will tend to shift and hold the valve head 35 in the closed or seated position in its seating aperture 37. The entire housing structure of the mechanism is the driver element, as it is connected securely with the fly wheel of the vehicle engine. The housing structure can rotate independently of the shaft 10, as the rear end of the spring 55 is engaged against the revoluble bearing 51 mounted on the sleeve 49, and otherwise the shaft 10 is revolubly engaged in the housing structure.

During idling speed of the engine, the weight members 57 will not be sufficiently actuated for tensioning the spring 55 to exert much pull on the valve head 35 tending to hold the latter in the closed seated position. The housing structure will rotate with the fly wheel, while the shaft 10 remains stationary, whereby reciprocal movement is imparted to the plungers 19 in the cylinders 16. The rearward suction strokes of the plungers will draw the fluid from the reservoir 8, through the passages 30, 31 and 17, into the cylinders, and the forward discharge strokes of the plungers will force the fluid from the cylinders, through the passages 17 and 32, into the pressure chamber 29. This fluid pressure will open the valve head 35 and allow escape of the fluid from said pressure chamber back into the reservoir, through the passages 38 in the valve head, to provide continuous fluid circulation.

When the speed of the engine is increased, the centrifugal action of the weight members 57 will tension the spring 55 and thereby tend to hold the valve head 35 in the closed position in its seating aperture 37. This will increase the pressure required for forcing the fluid from the cylinders 16 through the pressure chamber 29 into the reservoir 8 by the operation of the plungers 19. Such increased fluid pressure will tend to retard the independent rotation of the housing structure on the shaft 10, and further tend to cause the latter to rotate with the housing structure.

Variation in the relative revolving speeds of the housing structure and shaft 10 is allowed by the escape of some fluid through the graduated passages 38 in the valve head 35, when excessive fluid pressure in the pressure chamber is created, as in case when the starting travel of the motor vehicle is being effected. However, when the rolling momentum of the load is established by the travel movement of the vehicle, the pressure is reduced so as not to require relief through the passages 38, and the shaft 10 will rotate in unison with the housing structure.

If the load increases, as when the vehicle is travelling up a hill and the like, the fluid pressure again increases to require relief and thereby again establish change speeds of the housing structure and the shaft 10. In like manner, change speed is effected when the engine speed is reduced to cause the centrifugally actuated weight members 57 to release the tension of the spring 55, as when the motor vehicle is being slowed down, brought to a stop, and the like when the engine is operating at idling speed.

By depressing the pedal 68, the valve head 35 may be quickly forced to the open position when required, to discontinue the rotation of the shaft 10 with the housing structure, and as stated, the mechanism may be held in such neutral position by engaging the latch 73 of the hand lever 70 in the notched quadrant 74.

When the valve head 35 is shifted to the open position, the front end thereof will enter the cylinder 39 and force the fluid from the latter through the ports 40. The action of the valve ring 41 will prevent the fluid from reentering the cylinder 39 through the ports 40. However, the fluid may enter the cylinder 39 through the small notch 44 in the valve head, when the latter has shifted to the closed position.

The purpose of engaging the valve head 35 in the cylinder 39, as stated, is to prevent possible stalling of the engine by the quick snap return of the valve head to the closed position, as in the event that the operator's foot should slip from the pedal 68. The engagement of the valve head in the cylinder 39 will properly retard the movement of the valve head from the open to the closed position.

The present invention provides a most durable and efficient device of its kind, which is entirely automatic in its operation, and which may be successfully employed to operate a shaft at any speed to provide the power necessary to effect the start, propulsion, or operation of the apparatus it is intended to operate.

What I claim is:

1. In a power-transmission mechanism, the combination of a housing structure, a shaft revolubly mounted in said housing structure, fluid controlled means including a plurality of plungers actuated by the rotation of said housing structure for imparting rotation to said shaft, a valve element mounted in said housing structure and being automatically operable for controlling the revolving speed of said shaft with respect to the revolving speed of said housing structure, a spring for regulating the operation of said valve element, means for securing said valve element in the inoperative position in said housing structure, and automatically operable means for retarding the movement of said valve element to the operative position.

2. In a power-transmission mechanism, the combination of a housing structure, a shaft revolubly mounted in said housing structure, fluid controlled means automatically actuated by the rotation of said housing structure for imparting rotation to said shaft, a valve element mounted in said housing structure and being automatically operable for controlling the revolving speed of said shaft with respect to the revolving speed of said housing structure, a spring for regulating the operation of said valve element, centrifugally actuated means for automatically adjusting the tension of said spring, and means for securing said valve element in the inoperative position in said housing structure.

MARCUS A. HOLPFER.